Oct. 12, 1937. R. Z. DRAKE 2,095,319
APPARATUS FOR AND METHOD OF SEASONING LUMBER
Filed May 23, 1934 3 Sheets-Sheet 1

Oct. 12, 1937. R. Z. DRAKE 2,095,319
APPARATUS FOR AND METHOD OF SEASONING LUMBER
Filed May 23, 1934 3 Sheets-Sheet 2

Inventor,
Robert Z. Drake
By Parkinson & Lane, Atty.

Patented Oct. 12, 1937

2,095,319

UNITED STATES PATENT OFFICE 2,095,319

APPARATUS FOR AND METHOD OF SEASONING LUMBER

Robert Z. Drake, Omaha, Nebr.

Application May 23, 1934, Serial No. 727,119

14 Claims. (Cl. 34—19)

This invention relates to the seasoning of lumber and more particularly to apparatus for and method of accomplishing that result.

Among the objects of my invention is to provide for the piling of lumber edgewise in such manner that vertical air passages are formed between adjacent tiers.

A further object is to provide for obtaining and maintaining stability in a pile of edge-stacked lumber such as to insure the pile against collapsing and to hold the tiers with sufficient rigidity to maintain the side faces in such vertical alignment as to insure proper vertical air passages between each pair of vertical tiers.

Another object of my invention is to so stack the lumber edgewise and during such stacking apply means for securely anchoring the pile of edge-stacked lumber to a fixed vertical supporting means to prevent movement of any of the pieces of lumber during and after being stacked.

A further object of my invention is to provide a novel construction of means for spacing, spreading or sticking the edge-stacked lumber (which will hereinafter be referred to as a spacing element), so constructed as to properly space the edge-stacked lumber vertically and hold it properly spaced horizontally, these spacing elements being formed for quick attachment to and removal from adjacent fixed vertical columns, and when attached to said columns firmly and securely hold the edge-stacked lumber in rigid and proper position.

A still further object is to provide for holding such piles of edge-stacked lumber rigidly and securely in proper position in combination with a building in which the outside atmosphere may be freely admitted to the top of the building, and after moving downwardly through the vertical air passageways in the edge-stacked lumber will pass out of the building from the lower portion of the same below the stack of lumber.

Another object is to provide means for insuring proper contact of the spacing element with the edges of the lumber in cases where there might be manufacturing inequality in the sawing of the lumber.

A further object of my invention is to prevent the lumber when edge-stacked during the process of seasoning from shrinking, warping, twisting or cracking, and during the time of the seasoning of this edge-stacked lumber to allow it to attain its fully destiny of strength and toughness.

Another object is to provide apparatus for and method of more economically storing and handling edge-stacked lumber.

A further object is to provide means for insuring vertical alignment of the side faces of the pieces of edge-stacked lumber to more perfectly produce the necessary vertical air passages necessary to secure proper circulation downwardly between the tiers of lumber.

Another object is to provide novel means for setting in place the last several pieces of edge-stacked lumber in the upper outer edge of the pile when completing the same.

A still further object is to provide novel apparatus for and method of edge-stacking lumber for seasoning purposes in a more economical and facile manner and with a greater degree of safety to the men employed in stacking the same.

Further objects, advantages and capabilities will more fully hereinafter appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:—

Fig. 16 is a fragmentary plan view of one end of a modified form of my spacing element, showing a plurality of vertical openings therethrough for selective adjustment of the position of the outer piece of lumber in the respective rows.

Referring in detail to the drawings, and more particularly to Figs. 1–7, 1 designates in general a seasoning house comprising side walls 2, roof 3, foundation piling 4 and fixed vertical columns 5. In the upper portion of the seasoning house is a traveling crane 6, suitably mounted for longitudinal movement along supporting channels or trackways 7, and provided with the usual hoisting mechanism 8. Secured laterally across the upper ends of the foundation piling 4 are cap timbers 9, which are spaced from each other longitudinally of the building, there being no flooring applied to the top of these cap timbers 9, this flooring being omitted in order to permit a free downward travel of the currents of air for purposes as hereinafter more fully set forth.

Intermediate foundation pilings 4' have extending laterally therebetween the cap timbers 9', upon each end of which are mounted spacing blocks 10 which support the longitudinal cap timbers 11, which in turn support the inner ends of the cap timbers 9. Positioned longitudinally on the upper surface of the intermediate cap member 9' are floor boards 12, which occupy a position sufficiently below the loading tables 13 to permit a truck loaded with lumber to be discharged or unloaded onto the loading tables 13. Loading tables 13 are also provided with rollers 14 to facilitate longitudinal transfer of the pieces of lumber to any position desired along the length of the house.

Figure 1:
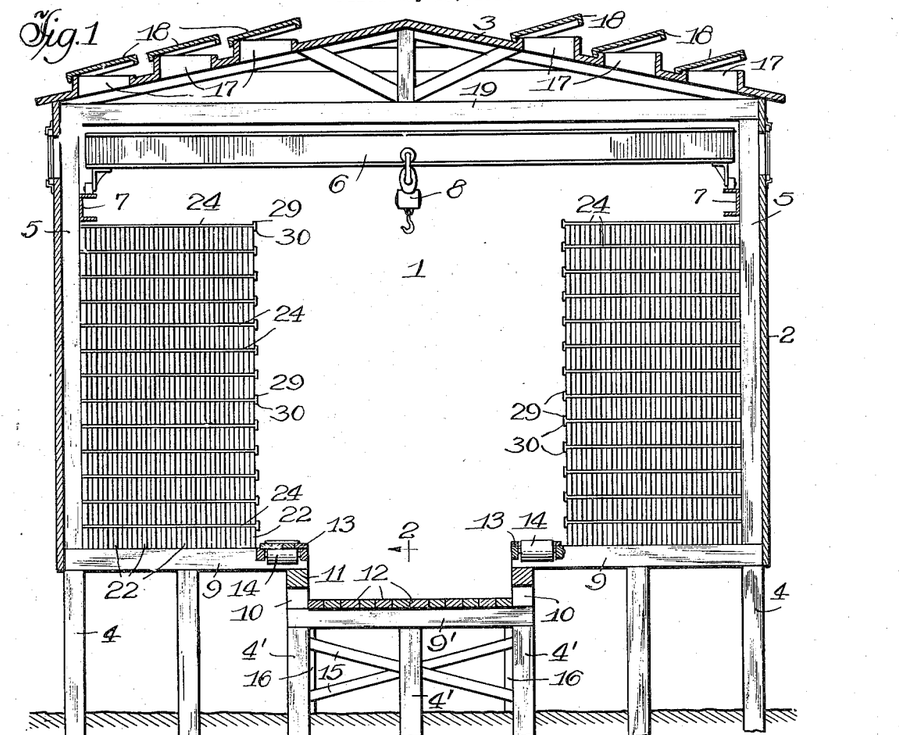
Fig. 1 is a vertical transverse section through a seasoning house, in which lumber is shown edge-stacked in accordance with my invention.
Figure 2:
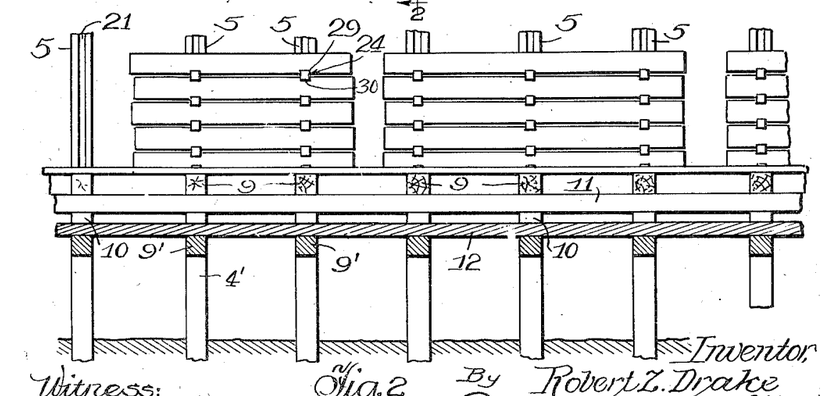
Fig. 2 is a fragmentary vertical longitudinal section on the line 2—2 of Fig. 1.

In Fig. 1 is shown transverse sway timbers 15 and longitudinal sway timbers 16 for bracing foundation piling, it being understood that similar sway timbers may, if desired, be positioned between any of the other piling in the building, as desired, for strengthening the same.

In the roof 3 are provided a suitable number of openings 17 for permitting entry downwardly into the house of the outside atmosphere, the entry of air downwardly through these openings being controlled by the hatch covers 18, which latter may be completely opened, partially opened, or closed, as desired, to control the entry of air downwardly into the house. It is also pointed out that these hatch covers may be opened upwardly a desired distance from any one of the four sides to accommodate themselves to the direction from which the wind is blowing. By this means rain, sunshine and other undesirable elements of the weather may be kept from entering the house in accordance with the wishes of the operator.

The vertical supporting or anchoring columns 5 are rigidly fixed together against lateral movement by the cross-beam 19, the outer ends of which are fixedly secured to the respective upper ends of the columns. Columns 5 are hollow, the opening therein extending longitudinally from one end to the other, there being provided on the inner face of the column a longitudinal slot communicating with the interior hollow portion of the column, the width of the slot being less than the width of the hollow portion, the interior hollow portion of the column being shown at 20 and the longitudinal slot at 21, as shown in Figs. 3, 4, 5 and 6.

These columns may be of any construction desired, such as being compositely or otherwise fabricated from wood, or they may be of metal or any other available and suitable material. Also while I have shown these columns herein as being of the particular construction described, I wish it understood that other shapes and construction may be used for laterally and rigidly supporting the stacks of lumber, without departing from the spirit of my invention, the essential thing being that the stacked lumber is to be tied to these columns in such manner as to give it great rigidity and stability in the finished pile and while the pile is being stacked. These columns to which the piles of edge-stacked lumber are to be tied may or may not support or be part of the building as desired, and any means of rigidly securing the columns in position may be employed.

As stated above, there is no flooring applied to the cap timbers 9, these cap timbers being spaced from each other suitable distances to provide a free flow of air downwardly therethrough. Also it is to be noted that the side walls 2 of the building do not extend below or any substantial distance below the tops of the foundation piling 4. By this is meant that a substantial open space is left in the lower portion of the side walls of the house for the free egress of air which has moved downwardly through the vertical spaces in the pile of edge-stacked lumber hereinafter described.

In stacking the lumber in accordance with the present invention, any suitable number of pieces are lifted with the crane and moved into position extending longitudinally of the building and transversely of the cap timbers 9. The first piece of lumber is then placed on edge with its side faces against the inner face of the column 5 and any desired position longitudinally of the building. Next a second piece of lumber is placed on edge parallel to the first piece of lumber and spaced therefrom a suitable distance, with the ends of the two pieces in approximate alignment. A third piece of lumber is then placed on edge a suitable distance from the second piece and parallel thereto, with the ends in alignment. This is continued until the desired number of pieces of lumber are thus set on edge, the adjacent pieces being likewise spaced from each other a suitable distance, this being continued until the horizontal row of these pieces of lumber is provided. The pieces of lumber standing on edge in the bottom horizontal row, as just described, are indicated in Fig. 1 at 22.

Figures 3, 7:
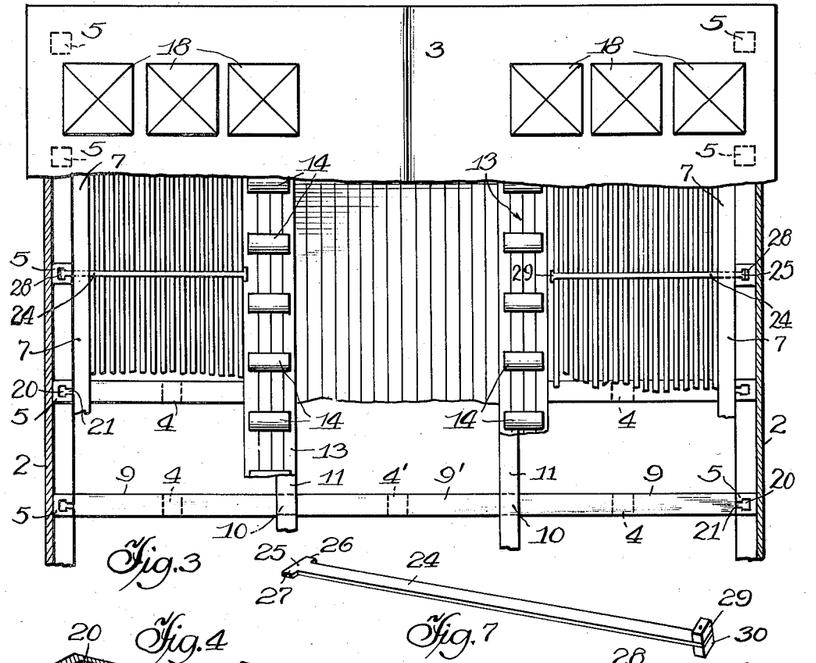
Fig. 3 is a fragmentary plan view of a seasoning house in which my invention is employed, a portion of the roof being broken away to show the interior.
Fig. 7 is a detail perspective view of one form of my improved spacing element.
Figures 4, 5, 6, 8:
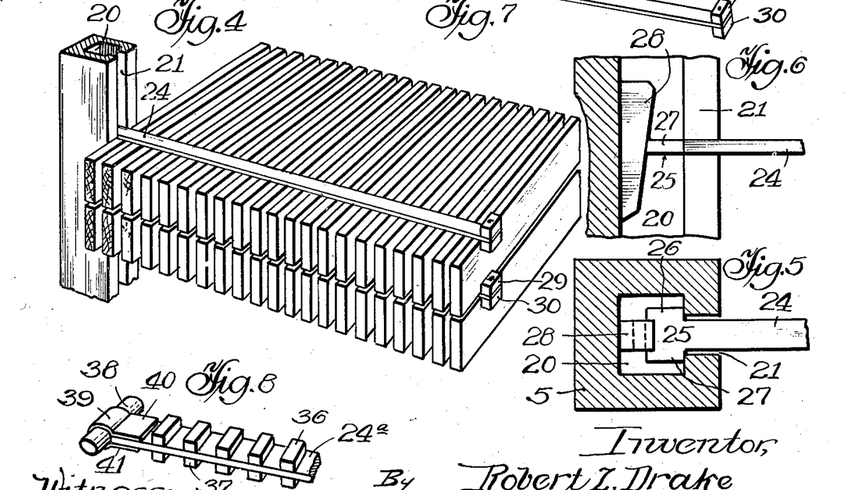
Fig. 4 is a fragmentary perspective view of two rows of edge-stacked lumber, showing the lumber of the tiers properly superimposed and with my improved spacing element for anchoring the edge-stacked lumber to fixed vertical columns.
Fig. 5 is a horizontal transverse section through the fixed vertical anchoring column, and showing a fragmentary end portion of the spacing element fixedly held in the vertical column.
Fig. 6 is a fragmentary vertical section through the column of Fig. 5, the section being taken in the direction of the length of the spacing element.
Fig. 8 is a fragmentary perspective detail view of a modified form of spacing element.

Next the operator takes one of the spacing elements 24 (see Fig. 7) and turns it into an edgewise vertical position so that the head 25 of the same stands parallel to the length of the slot 21 in the column, this head 25 being thus inserted into the hollow portion of the column and then turned at right angles to position its laterally extending projections 26, 27 back of the shoulders positioned along each side of the slot 21, as will be understood from Fig. 5.

As soon as the spacing element 24 is thus positioned it is moved downwardly until it lies flat along the upper edges of the pieces of lumber 22 forming the bottom row, as seen at the bottom of either one of the two stacks of lumber in Fig. 1. A tightening wedge 28 is then lightly tapped into place back of the head 25 of spacing element 24 to bring the inner faces of projections 26 and 27 into snug and firm engagement against the shoulders along each side of the slot 21, thus preventing any longitudinal movement of the spacing element 24. In other words, this wedge 28 holds this spacing element firmly in engagement with the fixed supporting column 5.

Upon the outer edge of spacing element 24 are provided lugs, flanges or other suitable laterally projecting portions, one of which projects upwardly as at 29 in Fig. 7, and one projecting downwardly as at 30 in said figure. The lower one 30 of these lugs or projections engages over the upper inner edge of the inside or last member 22 of the bottom row, thus insuring that this inner or last member cannot be moved out of its vertical edgewise position. This spacing element 24 extending along and in contact with the upper edge of each of the pieces of lumber in this bottom row will when the weight of the next succeeding superimposed row of lumber is applied thereon firmly hold all of the vertically positioned pieces of the next one or more lower rows in their proper position.

Figures 9, 10, 11, 12, 13, 14, 15, 17, 18, 19, 20, 21, 22, 23, 24, 25:
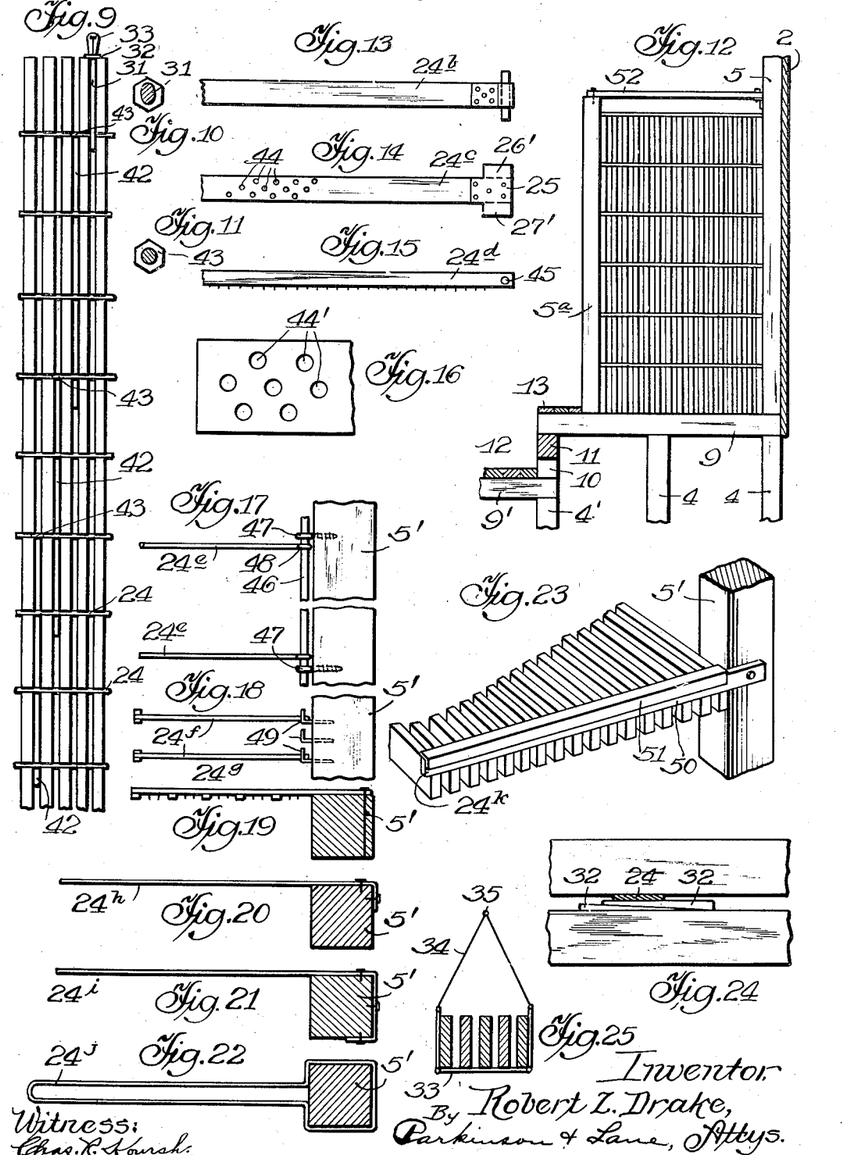
Fig. 9 is a fragmentary end elevation of a portion of a pile of edge-stacked lumber, showing the means for aligning the side faces of the lumber of adjacent tiers.
Fig. 10 is a transverse section through one of the aligning devices.
Fig. 11 is a transverse section through another form of aligning device.
Fig. 12 is an end elevation of a pile of edge-stacked lumber showing a modified method of stacking the same and employing two fixed vertical columns.
Figs. 13 and 14 are fragmentary plan views of modified forms of my improved spacing element.
Fig. 15 is a fragmentary side elevation of a further modification of my improved spacing element.
Fig. 17 is a fragmentary view partly broken away of a modification of means for securing the spacing elements to the fixed vertical column.
Fig. 18 is a fragmentary view of a further modification of the same.
Figs. 19, 20, 21 and 22 are further modifications of means for securing my improved spacing element to fixed vertical columns.
Fig. 23 shows another form of spacing element and means for securing the same to a fixed vertical column.
Fig. 24 is a fragmentary detail view showing means for securing firm contact between the spacing element and the edges of the lumber in cases of inequality in manufacture of the pieces of lumber.
Fig. 25 is a transverse sectional view through the five adjacent pieces of lumber which are last to be placed in position in the upper outer edge of the pile to complete the same, and showing means for handling the same to prevent accident to the workmen.

During the setting of the various pieces of lumber in the bottom row any suitable device may be used for properly spacing the pieces of lumber from each other, one form of such spacer being shown near the upper right-hand corner of Fig. 9 in the form of an elongated stick 31 which, as shown in Fig. 10, is oblong in cross-section, so that this stick may be inserted flatwise to gauge the distance between the two pieces of lumber, and if in stacking different thicknesses of lumber different spacing is desired, this may be accomplished by rotating the hand stick 31 the desired amount.

Should there be a great inequality in the sawing of the lumber being thus stacked so that the flat underface of the spacing element 24 does not sufficiently firmly contact the upper edge of the subjacent row, this space may be quickly filled up by inserting between the top edge of the irregular piece of lumber below the spacing element and the underface of the spacing element, a pair of take-up wedges 32 (see Fig. 24).

Any number of these spacing elements 24 may be laid laterally across the upper edges of the horizontal row, it being vital, however, that the number of these spacing elements be not great enough to materially obstruct the vertical passageways between the adjacent faces of the edge-stacked lumber. For convenience, I have shown in the drawings two of these spacing elements for each horizontal row of lumber, these being spaced inwardly from the ends of the pieces of lumber such a distance as to conveniently divide up the locations of these spacing elements along the length of the lumber. There must be at least two of these spacing elements longitudinally spaced along the length of each row but more than two within the limits of this invention may be used if desired.

The stacking of the next horizontal row of lumber on top of the spacing element 24 is then proceeded with in a similar manner, being careful at the same time that each piece of lumber is so positioned as to bring its side faces in vertical alignment with the subjacent side face of the piece of lumber next below. After the second row is thus placed in position on top of the spacing elements and in vertical alignment with the subjacent pieces, another set of spacing elements 24 are likewise spaced laterally across the upper edges of the second row of pieces of lumber in a similar manner, the spacing elements as the horizontal rows are multiplied being preferably kept in vertical alignment with each other so as to provide minimum obstruction of the vertical air passageways between the adjacent pieces of lumber of the respective tiers.

This edgewise stacking is continued until the pile is brought to the height desired, and in order to facilitate the work of stacking and increase the safety for the operators, the last five pieces to occupy the upper inner corner of the pile are positioned in a sling 33 properly spaced and held in position against lateral collapsing, this sling having converging cables, ropes or the like 34, and a suitable eyelet or other attaching point 35, which may be quickly and easily picked up by the crane hook and moved upwardly and swung inwardly into position to bring these last five pieces into proper vertical alignment with the subjacent pieces of lumber in order to continue to the top of the pile the vertical air passages between the adjacent faces of the pieces of lumber. As soon as these last five pieces are placed in position the slings 33, which will be positioned one near each end of the group of five pieces of lumber, will then be slipped off over the end or rotated through ninety degrees so as to faciltate their removal from between the edges of the superimposed pieces of lumber. The top spacing elements 24 will be placed in position on top of the pile either before or after the piling of these last five pieces, as may be found most convenient.

It will thus be seen that I have provided for the edge-stacking of a pile of lumber in a manner to form a plurality of vertically extending air passageways so arranged as to provide an air passageway between the vertical faces of the pieces of lumber in each pair of adjacent tiers, each of these passageways extending substantially unobstructed from the top to the bottom of the pile. It is also important to note that the spacing elements 24 (there being not less than two between each adjacent pair of horizontal rows) have firm contact with the edges of the pieces of lumber in the horizontal row both above and below them, and these spacing elements being firmly and securely anchored or tied to the fixed vertical columns 5 there is thus provided such a large degree of stability and rigidity to the edge-stacked pile that this pile is both firmly and positively held in position and the vertical air passageways are insured against being in any way disturbed in their vertical alignment. This insures stability of the pile and more surely forms and maintains the vertical air passageways.

With the pile of lumber thus stacked and securely held in position the outside air passes into the house through the hatches or openings 17, this outside atmosphere passing downwardly between the various tiers through the vertical air passageways, and thence downwardly to the lower portion of the house and out again to the outside atmosphere through the open spaces provided below the bottom edge of the siding of the house.

An impetus to this downward passage of air through these air passageways is caused by the sap being exuded from the lumber slightly chilling the air between the tiers, and the air being chilled it moves downward attracting other air to the upper surface of the pile through hatch openings 17. This action will continue as long as sap remains to be exuded from the lumber when the temperature of the lumber is lower than the temperature of the air at the top of the house, and while so continuing leaves the face of the lumber cool and moist and the wood cells on the face of the lumber continue to possess their natural vitality and can and do act with all the wood cells interior of them. This continuing, the cells of the lumber exhaust themselves of practically all their sap and must and do gain strength for this process of exudation in an increasing ratio in direct proportion as the sap grows more and more scarce, to the final end that when the sap is fully exuded the wood cells of which the lumber is entirely composed have reached their maximum strength and have attained a greatly increased cohesive faculty between all of the wood cells. The lumber then thus seasoned being very much stronger, tougher and being denuded of sap is much less liable to decay. The lumber in this process is not alone made harder but also is made very much tougher throughout its whole area.

As will be obvious from the above, taken in connection with the drawings, the spacing elements 24 when the lumber after seasoning is being removed from the pile may be readily detached from the fixed supporting columns 5 by simply loosening the wedges 28 in any desired manner, this being facilitated by first elevating the free or outer end of the spacing element. After removal of the wedge 28 the spacing element may be rotated through ninety degrees to bring the head 25 parallel with the slot 21, after which the head may be easily removed from the column through this slot. It is thus seen that these spacing elements 25 may be secured between the horizontal rows of the pile of lumber regardless of the vertical position of such horizontal rows. In other words, the slot 21 extending longitudinally of the pile 5 makes it possible to secure the spacing element 24 at any point vertically of the column 5 desired. The lugs, flanges, or the like 29 and 30 on the free end of spacing element 24 afford a lateral support for the innermost stick of lumber in each of the horizontal rows next above and below the spacing element 24. This in conjunction with the secure attachment of the head 25 to the fixed vertical column 5, together with the frictional support of the spacing element 24 with relation to the edges of the lumber in the adjacent horizontal rows, results in remarkable rigidity and stability to the pile of lumber thus stacked edgewise.

Fig. 4 shows two adjacent horizontal rows of pieces of lumber held in place by the spacing elements 24 and the fixed vertical column 5, this figure showing how the pieces of lumber in the vertical tiers are stacked edgewise in vertical alignment to provide between each pair of adjacent tiers vertical air passageways, it being understood that other horizontal rows will be added to what is shown in Fig. 4 to any desired number to complete the pile to the desired height, as shown in Fig. 1. It is, of course, understood that in adding the additional horizontal rows to the desired height the same idea of keeping the pieces of lumber in each tier in vertical alignment to preserve the vertical air passageways will be adhered to throughout the complete stacking of the pile.

Fig. 8 shows a modified form of spacing element 24a, which is provided throughout its length on either or both of its upper or lower faces with lugs 36, 37 to fit between the respective pieces of lumber in the adjacent horizontal row in order to properly space the same as well as give added rigidity and strength against lateral displacement. This form of spacing element shown in Fig. 8 also has a slightly differently constructed head which, as seen, comprises a laterally extending rod, tube or the like 38 firmly held in proper position with relation to the end of the spacing element 24a by a metal strap 39 tightly surrounding the member 38, and having its free ends 40 and 41 overlapping the adjacent end of the spacing element and secured thereto in any suitable way as by bolts, rivets, welding or the like. In use this form of head operates and is manipulated in the same manner as that described above in connection with the spacing element 24 shown in Fig. 7.

Fig. 9 shows a pile of lumber edge-stacked and securely held in accordance with my invention, in which are shown two forms of devices for quickly spacing the pieces of lumber at the proper distance apart laterally to quickly and easily bring the side faces of the pieces of lumber of each vertical tier in substantially vertical alignment to insure the vertical air passageways between the respective tiers. One of these spacing or gauging elements has been previously described, this being the element 31 shown at the upper right-hand corner of the pile in Fig. 9, this element 31 being of sufficient length to extend sufficiently beyond the width of the widest piece of lumber to be stacked so as to extend downwardly to overlap a portion of the face of the piece of lumber directly therebelow, this for the purpose of quickly bringing the vertical faces in vertical alignment.

To further insure this vertical alignment and continue care in maintaining it as the height of the pile increases other spreading elements of greater length may be used, which in Fig. 9 are shown at 42, there being three of these illustrated in Fig. 9. These may be round, as shown in Fig. 11, or oblong, as shown for the shorter spreader in Fig. 10, the oblong shape enabling further spreading of the slot by rotation of element 42 by applying a wrench or other suitable device to the hexagonal head 43 at the top of elements 42 for rotating the same to effect spreading by rotational movement of the oblong body. These hexagonal heads 43 will be of such thickness to lie within the spaces between the edges of the pieces of lumber in their adjoining rows, these spaces being created and defined by the spacing elements 24. These longer spreading elements 42 may or may not be left in the pile of lumber as desired, their diameter or cross-section being so small as not to interfere to any substantial degree with the vertical air passageways.

In Fig. 13 is shown a further modification of spacing element 24b, which is substantially the same in construction as the form shown in Fig. 8, except for the omission on the upper and lower faces of the spreading element of the lugs 36 and 37, it being understood, however, that in this form the lugs 29 and 30, shown in Fig. 7 at the free end of the spacing element, will be maintained.

Fig. 14 shows a further modification of spacing element 24c, in which the head 25 is reinforced by an iron strap bent around the two ends of the spacing element and provided with necessary lateral projections 26' and 27' to cooperate with the shoulders of the slot 21 in the vertical fixed columns 5. This form is also provided either at its free end or at any desired point along its length with a series of staggered openings 44, through any one of which may be inserted a vertically extending pin to define and brace the inner edge of the pile to give greater selectivity to the width of the pile. This pin when inserted in one of the openings 44 will then coact with the inner edge of the pile in the same manner as the lugs 29 and 30 in spacing element 24 shown in Fig. 7.

Fig. 15 is a side elevation of another form of spacing element 24d, having a transversely extending pin 45 to function as a head to cooperate with the slot 21 in the fixed vertical columns 5. This form of spreading element is provided on its bottom face at proper distances apart with downwardly extending sharpened tacks or studs, which when the spacing element is positioned on top of a horizontal row of edgewise stacked pieces of lumber will upon pressure downward upon the spacing element be driven one into the top edge of each of the subjacent pieces of lumber to further and more positively hold them against any possible lateral disturbance.

Fig. 16 is a fragmentary plan view of the inner end portion of a spacing element which may be according to any of the various forms illustrated and described herein, this figure showing staggered holes 44' similar to the holes 44 in Fig. 14 and for the same purpose, except that in Fig. 16 these holes are substantially at the free end of the spacing element instead of intermediate of its length.

Figs. 17 to 23, inclusive, show various forms of means for attaching the spacing elements to the fixed vertical columns, the vertical columns in these figures being solid in cross-section instead of hollow and having the spacing elements movably attached to various of the four outer faces of the fixed vertical column. For illustration, Fig. 17 shows a vertical rod, tube or the like 46 secured to one of the faces of the fixed vertical column (this fixed vertical column in Figs. 17 to 23 being indicated as 5') by screw eye bolts 47 or other suitable securing means. The spacing elements 24e are slidably mounted on these vertical rods 46 by corresponding eyelets 48, so that they may be moved up and down on the rods 46 and swung laterally out of the way or into operative position as desired, it being understood that the free end of each and all of the spacing element referred to in this specification will be provided at or near their outer end with some sort of lug, flange or the like to support and hold the last piece of lumber of each horizontal row against lateral displacement.

In Fig. 18 the spacing elements 24f are shown as being removably secured to the column 5' by eyelets which are removably inserted over upstanding pins 49, which in turn are screwed, driven or otherwise firmly secured in one of the faces of the columns 5', and are capable of being swung or moved into operative position by turning the spacing element on the upstanding pin 49. In both of Figs. 17 and 18 the upstanding pins 49 and the screw eyelets 47 and vertical rod 46 may if desired be secured to the side face of the column 5', so as to leave that face of this column which is next to the first piece of lumber in the horizontal row unobstructed, to permit this piece of lumber to be pushed flatwise against the adjacent face of the column.

Fig. 19 shows an arrangement of spacing element 24g, which may be applied to the end of the pieces of lumber in each horizontal row by nailing the adjacent end of the spacing element to the column 5' during or after the horizontal row of lumber has been placed in position. In this form are shown both lugs and sharpened tacks, studs or the like, the lugs fitting in between certain of the ends of the pieces of lumber in the horizontal row, and the tacks, studs or the like being pressed into the ends of such pieces. The lugs may be used alone, the tacks, studs or the like may be used alone, or they may be used conjointly, as shown in Fig. 19.

Fig. 20 shows a spacing element 24h, which at the end next to the column 5' is bent around the corner of the column and nailed to two faces of the column. This form may be placed across the upper edges of the horizontal pile as soon as it has been laid, and then tacked, nailed or otherwise secured to the vertical column 5'.

Fig. 21 shows another form of spacing element 24i, which is secured to three faces of the fixed vertical column 5' by nailing, screwing or otherwise fastening it thereto.

Fig. 22 shows another form of spacing element 24j, which is in the form of a bent loop having a head at one end which encompasses the fixed vertical column 5' on four sides, and is slidable vertically of this column to bring it into the desired position for its work. In this form the spacing elements prior to their being brought down into position for use may be slid upwardly along the column 5', and temporarily held in such elevated position until it is desired to bring one or more of them down for use. It is also to be understood that in this form the fixed vertical column 5' may be round, solid, tubular or any other desired form, the loop engaging the column being of a configuration to slidably fit the column.

In Fig. 23 I have shown another form of spacing element 24k, which comprises a strip 50 to occupy a vertical edgewise position at the end of each horizontal row of lumber, this strip 50 having the flange member 51 secured to its upper edge in such manner that this flange member will extend over the upper end edges of the pieces of lumber and a short distance therebetween to function as a spacing element. In this form the member 50 is fastened to the fixed vertical column 5' by nails, bolts, screws or any other suitable form of fastening means.

In Fig. 12 I have shown a modified method of and apparatus for edge-stacking of lumber in accordance with my present invention, the form in this figure comprising two or more rigid vertical columns instead of one, arranged in pairs. In this form the outer vertical column 5 described above in connection with Figs. 1 to 6 is retained, and there is added opposite thereto an auxiliary fixed vertical column 5a, which is first positioned at the desired distance from the column 5 to accommodate the width of pile intended to be stacked, and then firmly fixed in that position. The top of column 5a is then firmly fixed or connected to column 5 by means of a crossbrace 52, which will be securely fixed at its respective ends to the vertical columns 5 and 5a to hold them rigidly spaced and fixed in position.

This form is to facilitate the stacking and seasoning of pieces of lumber that are of less thickness than those in the form described in connection with Figs. 1 to 6. In the form shown in Fig. 12 the columns 5a may be placed in position and fixed therein either before the stacking of the lumber begins or after it has proceeded to any desired degree. During the stacking of lumber in accordance with the showing in Fig. 12, the spreading elements 31 and 42 shown in Fig. 9 are especially adaptable because of the pieces of lumber being thinner in proportion to their height, and it being necessary to prevent buckling in the lower horizontal rows by reason of the weight on them of the horizontal rows thereabove, and the necessity of maintaining unobstructed the vertical air passageways. By having two oppositely spaced fixed vertical columns this provides an abutment for receiving the thrust of this spreading action. While in Fig. 12 there is visible only one pair of these opposed fixed vertical columns it is to be understood that any number of pairs thereof will be used as desired to accommodate the length of the lumber being stacked in the pile. The seasoning of the lumber in such pile as shown in Fig. 12 is the same as previously described in connection with the other form or forms of piles, and is accomplished by the downward passage of the atmospheric air through the vertical air passageways in a similar manner.

For the purpose of securing and maintaining an unobstructed vertical air passageway of continued regular contours along the sides of edge-stacked lumber, and the seasoning benefit to this lumber from the air passing therethrough, it is to be understood that it is my intention to make use of any convenient or desirable means for securing stability to a pile of lumber by securing the attachment of such pile to any form of fixed vertical support, and while I show various forms of fixed vertical supports and various forms of spacing elements and several means of attaching spacing elements to various kinds and portions of fixed vertical supports it is to be understood that it is my intention to use any convenient or desirable forms of fixed vertical supports and any means of attaching spacing elements to any parts of any fixed vertical supports and any convenient or desirable forms of spacing elements necessary to secure stability to a pile of lumber, for the purpose stated.

Having now described my invention, I claim:

1. In combination in apparatus for securely holding a pile of edge-stacked lumber of superimposed horizontal rows of pieces of lumber stacked on edge to form a plurality of vertical tiers with the pieces of each tier being in substantial vertical alignment and each tier being laterally spaced from its nearest adjacent tier to form vertical air passageways between the tiers, comprising a seasoning house in which said lumber is stacked, said seasoning house including in its construction a plurality of fixed vertical supports spaced apart from each other and along one face of which one side of the pile of lumber is positioned, each of said supports being formed with a longitudinally extending hollow interior with a longitudinal slot of less width than the hollow interior, the slot opening on that face of the support toward the stack of lumber, and a plurality of spacing elements between each pair of adjacent superimposed horizontal rows, said spacing elements being adapted to be gripped between said rows by the weight of the lumber, each of the spacing elements having an enlarged head of greater width than the width of said slot, said head being positioned in the hollow interior of one of said supports and slidable longitudinally of the support prior to the placing of its spacing element between horizontal rows of lumber.

2. In combination in apparatus for securely holding a pile of edge-stacked lumber of superimposed horizontal rows of pieces of lumber stacked on edge to form a plurality of vertical tiers with the pieces of each tier being in substantial vertical alignment and each tier being laterally spaced from its nearest adjacent tier to form vertical air passageways between the tiers, comprising a seasoning house in which said lumber is stacked, said seasoning house including in its construction a plurality of fixed vertical supports spaced apart from each other and along one face of which one side of the pile of lumber is positioned, each of said supports being formed with a longitudinally extending hollow interior with a longitudinal slot of less width than the hollow interior, the slot opening on that face of the support toward the stack of lumber, and a plurality of spacing elements between each pair of adjacent superimposed horizontal rows, said spacing elements being adapted to be gripped between said rows by the weight of the lumber, each of the spacing elements having an enlarged head of greater width than the width of said slot, said head being positioned in the hollow interior of one of said supports and slidable longitudinally of the support prior to the placing of its spacing element between horizontal rows of lumber, and means for positively holding the spacing element head and spacing element against horizontal movement with relation to the support whereby to provide positive prevention against horizontal movement or falling over of the stack of lumber.

3. Apparatus for securely holding a pile of edge-stacked lumber against lateral displacement, comprising a plurality of vertical supports, a plurality of spacing elements for vertically spacing from each other superimposed horizontal rows of lumber stacked on edge with the weight of the lumber bearing against said spacing elements and gripping them between the edges of the lumber of adjacent rows, the vertical supports and one end of each of the spacing elements being so constructed and related that the spacing element can slide longitudinally of the major length of the support to which it is connected prior to the stacking of the lumber, and means for holding the spacing element rigidly to its support and positively against horizontal movement with relation thereto when the lumber is stacked whereby to provide positive prevention against horizontal movement or falling over of the stack of lumber.

4. Apparatus for holding against lateral displacement a pile of lumber stacked edgewise, comprising stationary fixed vertical supporting means, spacing elements extending laterally across the top edges of the pieces of lumber of each horizontal row and resting thereagainst to vertically space the horizontal rows and hold the pieces of lumber laterally spaced from each other and the pieces of each vertical tier in substantial vertical alignment to form vertical air passageways, means adjacent one end of each spacing element to positively hold the last pieces of lumber in a horizontal row immediately above and below the spacing element against lateral displacement away from the pile, and means on the other end of each of said spacing elements to securely fasten it to said fixed vertical supporting means, whereby the pile of lumber will be firmly held against lateral displacement and maintain the vertical air passageways in substantially unobstructed condition to permit the flow of air therethrough to season the lumber in the pile.

5. In apparatus for seasoning lumber, a house having a roof, side walls terminating a distance above the ground to form bottom openings to the atmosphere, fixed vertical side columns, and an open framework near the bottom of the house adapted to have lumber stacked edgewise thereon in horizontal rows and vertical tiers, hatch openings in the roof, hatch covers for said hatch openings adapted to close the latter or permit air to pass downwardly therethrough from the outside atmosphere into the house, spacing elements extending laterally across the upper edges of the pieces of lumber in each horizontal row to hold the pieces in each horizontal row spaced apart laterally, and the pieces in each vertical tier in substantial vertical alignment to form a continuous substantially unobstructed vertical passageway between each pair of adjacent tiers, through which air from the hatch openings in the roof may flow downwardly and then out of the house through the openings in the bottom of the sides, and means for securely fastening an end of the spacing elements to the fixed vertical side columns of the building to hold the stacked lumber against lateral displacement.

6. In apparatus for seasoning lumber in an edge-stacked pile, stationary vertical supporting means, spacing elements extending laterally between the horizontal rows of pieces of lumber in the pile and being gripped between the edges of the pieces of lumber in adjacent rows, means at one end of each spacing element for securing the latter to a vertical supporting means, and slidable longitudinally of the supporting means throughout the greater portion of its length before the spacing element is incorporated in the stack of lumber, means for positively holding the spacing element against horizontal movement after being incorporated in the stack of lumber, and means at the opposite end of each spacing element to form a positive stop against movement away from the pile of the last piece in each horizontal row.

7. In apparatus for seasoning lumber in an edge-stacked pile, stationary vertical supporting means, spacing elements extending laterally between the horizontal rows of pieces of lumber in the pile, means at one end of each spacing element for securing the latter to a vertical supporting means, said means being slidable longitudinally of the supporting means throughout the greater part of the length of the latter before the spacing element is incorporated in the stack of lumber, means for positively holding the spacing element against horizontal movement after being incorporated in the stack of lumber, and means at the opposite end of each spacing element to form a positive stop against movement away from the pile of the last piece in each horizontal row, said spacing elements also holding the pieces of lumber in each horizontal row laterally spaced from each other to form spaced apart vertical tiers with air passageways therebetween extending from the top to the bottom of the pile.

8. In apparatus for seasoning lumber, stationary vertical supports, horizontally extending spacing elements, and means for slidably securing said elements to said supports to firmly hold a pile of edge-stacked lumber against lateral displacement and provide vertical air passageways through the pile from top to bottom, said spacing elements resting upon the horizontal row of lumber immediately therebelow and supporting the lumber thereabove, said means positively holding the spacing elements against horizontal endwise movement in both directions when the spacing elements are incorporated in the stack of lumber.

9. The method of stacking lumber for seasoning, which consists in laying edgewise on an openwork support a horizontal row of pieces of lumber, spacing such pieces laterally apart, placing laterally across the upper edges of the pieces thus laid and resting thereon a plurality of elongated spacing elements having vertical sliding engagement with adjacent fixed vertical supports, anchoring said spacing elements to said supports to positively prevent endwise movement of the spacing elements in either direction, laying a second horizontal row of spaced apart pieces of lumber edgewise on said spacing elements and resting thereon, placing a similarly arranged and anchored plurality of spacing elements across the top of said second row, and similarly continuing the alternate laying of horizontal rows and spacing elements to the desired height, whereby the stack of edge-stacked lumber will be positively anchored against falling over and with the spacing elements gripped between the rows, and with vertical air passages through the stack for seasoning purposes.

10. Apparatus for holding a pile of edge-stacked lumber against displacement, comprising a plurality of spaced apart horizontally aligned vertical columns, anchoring means extending longitudinally of said columns, spacing elements for each of said columns, each of said spacing elements adapted to lie across and rest upon the upper edges of a horizontal row of laterally spaced pieces of edge-stacked lumber and have stacked thereon to rest thereon another similar horizontal row so that the spacing element will be gripped between adjacent horizontal rows of edge-stacked lumber, each of said spacing elements having one end formed to so engage with said anchoring means as to positively anchor the spacing elements to the vertical columns against movement in either direction longitudinally of the spacing elements, whereby to positively hold the pile of edge-stacked lumber against falling over regardless of its height.

11. Apparatus for holding an edge-stacked pile of lumber against lateral displacement, comprising vertical columns positioned adjacent the side of the pile, the lumber in said pile being stacked edgewise in horizontal rows and vertical tiers to provide air passageways extending vertically through the pile from top to bottom, spacing elements between each pair of horizontal rows, one end of each spacing element being detachably connected to a column to firmly anchor the pile to the columns against lateral movement, but permit the removal of the spacing elements when the pile of lumber is taken down after being seasoned, the columns being hollow with an elongated slot in one face, the spacing elements each having a head which when turned in one direction will pass laterally through said slot, and when turned in another direction will engage the shoulders along the inner edges of the slot and be prevented from pulling through the slot but allow movement of the spacing element longitudinally of its column to permit the spacing element to be brought into contact with the upper face of a row of lumber, whereby to give stability to a pile of edge-stacked lumber and permit it to stand against lateral displacement when built to such a height that the air spaces between the tiers may be high enough so that greater force of downward circulation of air may be induced to result in more intensive downward circulation.

12. Apparatus for securely holding against lateral displacement a pile of edge-stacked lumber, comprising a plurality of spaced laterally aligned stationary fixed vertical supports, each of said supports having a longitudinally extending hollow portion provided with a slot of less width than the width of the hollow portion and opening through one face of the support, a plurality of spacing elements each having a head on one end slidably mounted in said hollow portion, the spacing element extending through said slot whereby said spacing elements may be slid vertically and longitudinally of its support, an open framework adapted to support a plurality of horizontal rows of pieces of lumber placed on edge with said pieces being laterally spaced apart, two or more of said spacing elements being positioned between each pair of adjacent rows with the spacing elements resting on the upper edges of the row directly therebelow and the lower edges of the row directly thereabove resting on the said spacing elements, the outer ends of the spacing elements having stop means for preventing the outermost piece of lumber in each row from becoming displaced laterally from the pile.

13. The method of stacking and securing to stationary vertical supports against lateral displacement a pile of edge-stacked lumber for seasoning, which consists in laying on an openwork base a horizontal row of pieces of lumber on edge and laterally spaced apart, attaching to each support a spacing element, placing each of said spacing elements across the upper face of said row to bear against the upper edges of the pieces of lumber therein, laying another similar horizontal row of pieces of lumber on edge above and resting upon said spacing elements, similarly attaching to each support a spacing element and placing the same across the upper face of the last mentioned row to rest upon the upper edges of the pieces of lumber therein, continuing this until the stack of lumber is of the desired height, and during the stacking of the pieces of lumber arranging them in vertical tiers to form vertical passageways, and during the stacking positioning stop members against the outer face of each of the last piece of lumber to prevent outward movement of the last piece of lumber in each row, whereby to positively hang a pile of edge-stacked lumber laterally to the stationary vertical supports with the spacing elements gripped between the edges of the pieces of lumber and with vertical air passages through the stack of lumber for seasoning purposes.

14. A lumber seasoning device comprising an open frame work support, stationary lateral supports fixed adjacent thereto, spacers slidably secured to said lateral supports and adapted to be gripped between superimposed rows of lumber pieces on said open frame work support with the lumber pieces of each row standing on edge and spaced from each other and with the corresponding lumber pieces in the superjacent and subjacent rows in vertical alinement to provide vertical passages among the alined pieces, said spacers having means for laterally supporting the adjacent lumber pieces to positively tie the pile to the stationary supports, and means having inlet and outlet openings to provide for the passage of atmospheric air through said vertical passages.

ROBERT Z. DRAKE.